United States Patent [19]
Bick
[11] 4,168,652
[45] Sep. 25, 1979

[54] POWER TRANSFER UNIT

[75] Inventor: David E. Bick, Newent, England
[73] Assignee: Dowty Rotol Limited, Gloucester, England

[21] Appl. No.: 883,945
[22] Filed: Mar. 6, 1978
[30] Foreign Application Priority Data
Mar. 9, 1977 [GB] United Kingdom ................. 9921/77
[51] Int. Cl.2 ................................................ F01B 3/00
[52] U.S. Cl. ........................................ 91/502; 60/403; 60/419; 60/455; 417/271
[58] Field of Search ................. 60/403, 426, 430, 455, 60/539, 419; 91/61, 500, 501, 502; 417/271

[56] References Cited
U.S. PATENT DOCUMENTS

| | | | |
|---|---|---|---|
| 1,229,009 | 6/1917 | Allison | 417/271 UX |
| 2,935,952 | 5/1960 | Rose | 60/419 X |
| 3,369,491 | 2/1968 | Hoffer | 60/455 X |
| 3,855,903 | 12/1974 | Bunyan | 91/502 X |
| 3,986,436 | 10/1976 | Kaufman et al. | 91/502 |

*Primary Examiner*—Edgar W. Geoghegan
*Attorney, Agent, or Firm*—Young & Thompson

[57] ABSTRACT

A power transfer unit for transferring power between two separate hydraulic circuits comprising a casing, a pair of cylinder blocks in the casing, cylinders within each cylinder block, a piston in each cylinder, a leakage chamber within the casing, cam means located in said chamber for causing joint reciprocation of the pistons, pistons or extensions thereof extending from the cylinders to the cam means in the chamber, first valve means co-operating with the cylinders of the first block, second valve means co-operating with the cylinders of the second block, first leakage collecting means for the first valve means separate from said chamber, second leakage collecting means for the second valve means separate from said chamber, and a vent for said chamber separate from said leakage collecting means.

By this arrangement any leakage to the chamber may be from either or both circuits and by virtue of the vent may be disposed of rather than fed back to either circuit.

14 Claims, 5 Drawing Figures

POWER TRANSFER UNIT

This invention relates to a power transfer unit for use in the transfer of hydraulic power between two independent hydraulic circuits without the transfer of hydraulic liquid between the circuits. Depending on the construction of the unit, the power may be transferred at the same hydraulic pressure or with a proportional increase or decrease in hydraulic pressure. The invention could be used on an aircraft between two independent hydraulic circuits powered by separate pumps on separate engines. The purpose of the power transfer unit on an aircraft is to enable a hydraulic circuit to remain operative even though its engine driven pump has become inoperative.

In accordance with the present invention a power transfer unit comprises a casing, a pair of cylinder blocks in the casing, cylinders within each cylinder block, a piston in each cylinder, a leakage chamber within the casing, interconnecting means arranged between the pistons of one block and the pistons of the other block to ensure joint reciprocation of the pistons, said interconnecting means being located in said chamber and pistons or extensions thereof extending from the cylinders into the chamber, first valve means co-operating with the cylinders of the first block, second valve means co-operating with the cylinders of the second block, first leakage collecting means for the first valve means, separate from said chamber, second leakage collecting means for the second valve means separate from said chamber, and a vent for the said chamber separate from said leakage collecting means.

The cylinder blocks may be rotary and the said leakage chamber may be sealed to each block by a rotary seal to isolate the chamber from the said leakage collecting means.

The rotating cylinder blocks may rotate about a common axis and the cylinders in the blocks may be parallel to the common axis.

The interconnecting means may include a cam device causing piston reciprocation during block rotation.

The interconnecting means may include a plurality of piston joints securing the pistons together in pairs, of which each pair comprises a piston in one block and a piston in the other block.

Each block may have a flat block surface remote from the chamber into which surface cylinder ports may open and each said valve means may comprise a floating valve plate having main ports to engage the associated block surface. The floating valve plate may be hydraulically loaded against the associated block surface.

One embodiment of the invention will now be described with reference to the accompanying drawings, in which.

Figure 1:
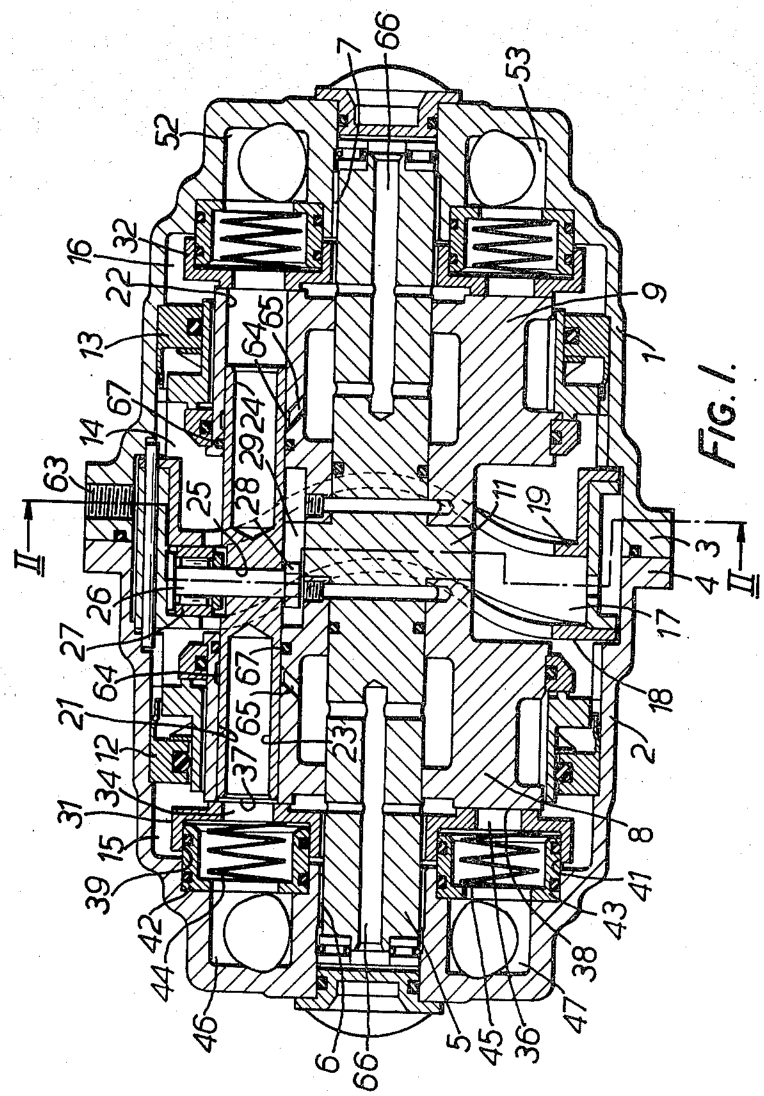
FIG. 1 is a longitudinal cross-section through the power transfer unit.
Figure 2:
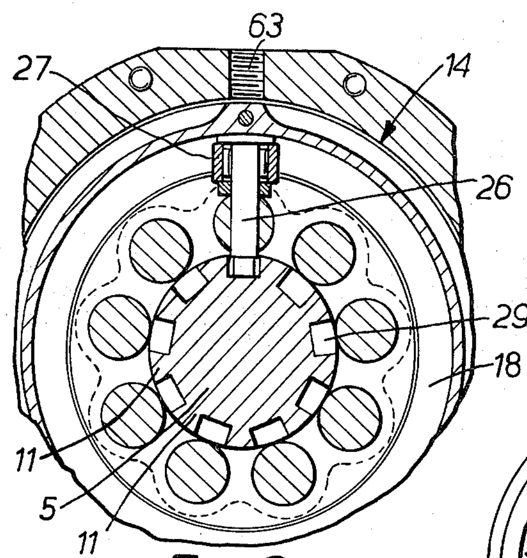
FIG. 2 is a partial cross-section taken on the line II—II on FIG. 1.
Figure 3:
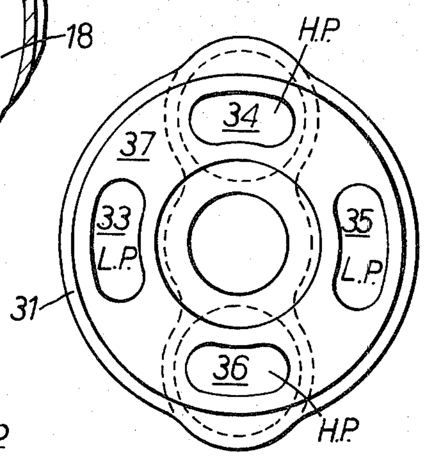
FIG. 3 is a plan view of a valve as used in FIG. 1.

Initially reference is made to FIG. 1. The unit is mounted in a casing formed of two parts, 1 and 2, secured together by bolts at flanges 3 and 4. A central rotary shaft 5 is mounted in the casing, being suitably supported at each end by bearings 6 and 7 providing for both radial and axial thrust. A cylinder block unit comprising a pair of cylinder blocks 8 and 9 is mounted on the shaft 5, the blocks being fitted tightly on the shaft and maintained correctly spaced by flange 11 on shaft 5. Around the peripheries of the blocks 8 and 9 a pair of seals 12 and 13 are located which act between the casing and the cylinder blocks to define within the casing a central chamber 14 and a pair of end chambers 15 and 16. Seals 8 and 9 are of conventional construction.

Around the inner surface of the casing within the central chamber 14 a cam track 17 is formed comprising a pair of flanges 18 and 19 projecting inwardly of the casing.

Within each cylinder block ten cylinders are provided, the cylinders being indicated at 21 for the block 8 and at 22 for the block 9. For each cylinder 21 in block 8 there is a co-axial cylinder 22 in the block 9. As shown, the cylinders 21 and 22 have equal cross-sectional areas, but within the scope of the present invention the cylinders could have different cross-sectional areas if it is required that the power transfer unit is to provide a proportional increase or decrease of pressure between circuits. As shown in the drawing, a pair of cylinders 21 and 22 are formed by a single boring operation which ensures that the two cylinders are exactly aligned. Within each cylinder 21 a piston 23 is reciprocable and within each cylinder 22 piston 24 is reciprocable. For a pair of cylinders 21 and 22 the two pistons 23 and 24 are formed from a single piece of metal and the two pistons will have a single uniform cylindrical surface formed by one machining operation. The central part of each piston pair is effectively a joint holding the two pistons together. For the purpose of piston reciprocaton a transverse bore 25 is formed in each piston pair, each bore 25 accommodating a transverse pin 26. At its outer end the pin 26 is provided with a needle roller bearing 27 of such diameter as to fit comfortably between the flanges 18 and 19 of cam track 17. The pin at its inner end engages a slide 28 which fits within a slot 29 formed in the adjacent parts of blocks 8 and 9 and in flange 5. The purpose of slide 28 and slot 29 is to constrain pin 26 and pistons 23 and 24 against the rotation about a common piston axis within the cylinder blocks. The joints for the piston pairs, pins 26, bearings 27 and cam tracks 17 together form the interconnecting means.

Within each end chamber 15 and 16 a valve respectively 31 and 32 is provided. These valves are of exactly similar structure and for the purpose of convenience only the valve 31 will be described in detail. The valve 31 is provided with four main ports 33, 34, 35 and 36, equi-distantly disposed within a flat valve surface 37. The surface 37 engages against a flat surface 38 at the outer end of cylinder block 8, whereby the ports 33 to 36 will co-operate with the outer ends of the cylinders 21 during cylinder block rotation, the outer ends of the cylinders forming cylinder ports. The surface of the valve 31 opposite to the surface 37 includes a pair of spaced cylinders 39 and 41, the cylinders 39 being located behind port 34 and cylinder 41 being located behind port 36. A pair of hollow sleeves 42 and 43 are fixedly secured to the casing part 2, such sleeves engaging in the cylinders 39 and 41, to hold the valve 31 in position. Springs 44 and 45 within the sleeves 42 and 43 constantly urge the valve 31 onto the flat surface 38.

Figure 4:
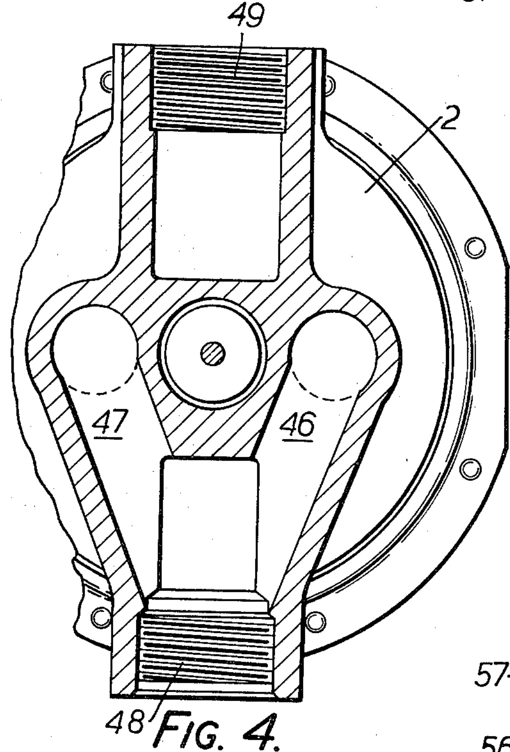
FIG. 4 is a view of one end of the unit showing connections thereto.

The mounting of the hollow sleeve 42 in the casing part 2 makes connection to the end of a high pressure passage 46 and similarly the sleeve 43 in its mouhting makes connection to the end of a high pressure passage 47. Referring now to FIG. 4 the arrangement of the end of casing part 2 is shown together with the hydraulic connections for the unit. These connections comprise a high pressure connection 48 and a low pressure connection 49. Within the casing part 2 the high pressure connection 48 divides into the two passages 46 and 47. The low pressure connection 49 effectively connects into the end chamber 15 which has direct access to the openings from ports 33 and 35 on the side of valve 31 opposite to the surface 37.

Casing part 1 includes the valve 32 which is similarly mounted on hollow sleeves in connection with high pressure passages as described for the valve 31. Thus for the casing part 1 there is a high pressure connection 51 connecting to the two high pressure passages 52 and 53 and a low pressure connection 54 connecting to the end chamber 16 (see FIGS. 1 and 5).

Figure 5:
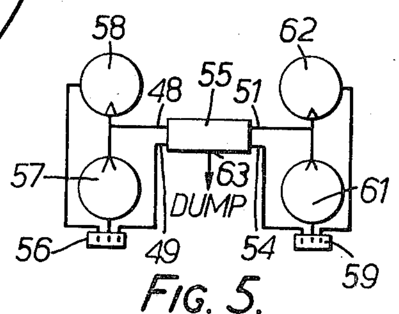
FIG. 5 is a circuit diagram using the power transfer unit.

FIG. 5 shows a very simple circuit diagram in which the power transfer unit shown in FIGS. 1 to 4 is indicated at 55. This unit co-operates with two hydraulic circuits, the first circuit comprising a reservoir 56, a pump 57 drawing liquid from the reservoir and delivering it to a hydraulic load such as a motor 58 from which return flow goes back to reservoir 56. The second circuit comprises a reservoir 59, a pump 61, drawing liquid from the reservoir 59 and delivering it to a motor 62, from which the return flow goes back to the reservoir 59. The power transfer unit 55 of the invention is connected so that the two high pressure connections 48 and 51 thereof are connected respectively to the high pressure pump deliveries from the pumps 57 and 61 of the two circuits. The low pressure connections 49 and 54 of the unit 55 connect respectively to the two reservoirs 56 and 59 of the two hydraulic circuits.

One of the necessary functions of the power transfer unit is to prevent liquid from one circuit obtaining access into the other circuit. Within the power transfer unit leakages from the valves will have direct access to the two end chambers 15 and 16 which connect directly to the reservoirs of the respective hydraulic circuits. Clearly the seals 12 and 13 will ensure that there is no possibility that leakage liquids within chambers 15 and 16 can mix. However, the central chamber 14 will collect leakage liquid, if any, from the inner ends of the cylinders 21 and 22 and a vent 63 is provided leading from the central chamber. This vent is carefully connected so that the liquid flowing therein does not have access to either of the two circuits. In fact, on an aircraft liquid from the vent 63 will be simply dumped overboard.

In order to prevent excessive leakage from the inner ends of the cylinders 21 and 22, each cylinder adjacent its inner end includes an annular groove 64 which is connected through passages 65 and 66 respectively in the cylinder block and the central shaft 5 so that leakage flow is connected to the adjacent shaft bearing 6 or 7. From the bearings 6 or 7 leakage flow will then pass into the end chambers 15 or 16 respectively. Adjacent to the inner end of each cylinder an elastomeric seal 67 is provided which engages the piston and will again act to reduce leakage of liquid into the central chamber 14. The groove 64 for each cylinder will ensure that only right, return flow pressure of pipes 49 or 54 is exerted on the seal 67. However, such return flow pressure will almost certainly be greater than the pressure at vent 63, thus each seal 67 must be capable of resisting leakage at low pressure.

When the unit is in use high hydraulic pressures from the two hydraulic circuits are fed from the high pressure connections 48 and 51. These hydraulic pressures will be fed to the high pressure ports of the two valves to enter the cylinders and to act oppositely on the pistons 23 and 24 therein. If the pressures are equal there is no resultant thrust on the pistons and the cylinder blocks will not rotate. Assume now that the pump 61 in the second circuit fails so that pressure at the high pressure connection 51 will fall. It will now be seen that high pressure will act on the left-hand piston 23 as seen in FIG. 1 to urge it to the right. causing liquid to be displaced into the high pressure connection 51. Movement to the right will cause the pin 26 to engage the cam track 17 and to exert a rotary torque on the two cylinder blocks. The cam track 17 is arranged to cause two reciprocations of each pair of pistons for one revolution of the cylinder blocks and for this purpose it will be seen that each cylinder is alternately connected to high pressure and low pressure ports during its rotation. The various thrusts which are exerted when a cylinder is connected to high pressure will occur at two diametrically opposite positions of the associated cylinder blocks and any side loads developed on the cylinder blocks as a result of high pressure will, to a large extent, cancel each other. Thus radial loads exerted on the shaft 5 through its bearings are at a minimum. A further benefit of the arrangement giving two piston strokes per revolution is that the rotational speed of the cylinder blocks need only be half the reciprocation frequency of the pistons, thus reducing losses due to friction particularly at the valve surfaces.

The action of pressure in the cylinders 39 and 41 is to urge the valve into sealing contact with the associated face 38 of the cylinder block, the size of the cylinder being so arranged that the thrust produced on the valve 31 is sufficiently large to hold the valve in position against the largest hydraulic parting force. The largest hydraulic parting force will be produced when three cylinders are in connection with a high pressure port. By arranging the cylinders 39 and 41 to have a very short length compared with diameter enables the valve 31 to tilt as well as to move axially in making sealing contact with the cylinder block surface 38. Further, it will be appreciated that the sleeves 42 and 43 perform the function of locating the valve 31 against rotation about the cylinder block axis.

It will be seen that when the unit 55 operates to supply hydraulic pressure to pressure connection 51, the transfer of this pressure is effected by direct transmission of thrust between the two pistons of a pair, making for a simple structure of power transfer unit. Also, during operation when hydraulic power is being supplied to the second circuit, the low pressure connection 54 connecting to the second circuit will draw liquid from the second reservoir 59 into the cylinders 22 of the unit when the pistons 24 therein are moved inwardly. Such inward movement of the pistons is obtained by thrust transmitted to the pistons through the cam track 17, the inward movement of a piston 24 at low pressure also causing displacement outwardly of liquid at low pressure from the opposite cylinder 21, by movement of the piston 23 therein.

Whilst the described embodiment is directed to a power transfer unit having rotary cylinder blocks, it will be appreciated that within the broad scope of the invention many modifications may be made. For example, the blocks may be non-rotary and piston reciprocation may then be effected by a rotary swash plate. Further, whilst the described embodiment provides that the two cylinder blocks are secured together as an integral unit it is within the scope of the invention for these blocks to be separate rotary cylinder blocks which may be either co-axial or inclined to one another, the pistons of the blocks being connected together in conjunction with means which will ensure cylinder block rotation following piston reciprocation.

I claim:

1. A power transfer unit comprising a casing, of pair of cylinder blocks in the casing, cylinders within each cylinder block, a piston within each cylinder, a leakage chamber within the casing, interconnecting means arranged between the pistons of one block and the pistons of the other block to ensure joint reciprocation of the pistons, said interconnecting means being located in said chamber and pistons or extensions thereof extending from the cylinders into the chamber, first valve means co-operating with the cylinders of the first block, second valve means co-operating with the cylinders of the second block, first leakage collecting means for the first valve means separate from said chamber, second leakage collecting means for the second valve means separate from said chamber, and a vent for said chamber separate from said leakage collecting means.

2. A power transfer unit as claimed in claim 1, including rotary mountings for the cylinder block and a rotary seal for each cylinder block arranged to separate the said chamber from each said leakage collecting means.

3. A power transfer unit as claimed in claim 2, wherein the cylinder blocks rotate about a common axis and all cylinder axes are parallel to the rotation axis.

4. A power transfer unit as claimed in claim 2, including a cam device forming part of the interconnecting means arranged to cause piston reciprocation during block rotation.

5. A power transfer unit as claimed in claim 4, including a piston joint for each pair of pistons having a piston in one block and a piston in the other block, said piston joints forming part of the interconnecting means.

6. A power transfer unit as claimed in claim 2, including for each cylinder block a flat block surface remote from the said chamber, into which surface cylinder ports open, and each said valve means comprises a floating valve plate engaging the associated block surface, said floating valve plate having main ports which cooperate with the cylinder ports of the block surface.

7. A power transfer unit as claimed in claim 6, including hydraulic balance means for each floating valve plate to urge it against the associated block surface.

8. A power transfer unit as claimed in claim 6, wherein the said first and second leakage collecting means comprise second and third chambers, each located to enclose the associated block surface and valve plate and thereby to collect leakage from the valve plate.

9. A power transfer unit as claimed in claim 8, including for each valve plate at least one low pressure port opening into the associated second or third chamber, and a low pressure connection for each of said second and third chambers.

10. A power transfer unit as claimed in claim 9, including for each of said second and third chambers a high pressure port in the wall of the chamber and a sleeve piston connecting to said high pressure port and arranged to make a sliding connection with the associated valve plate whereby to connect said high pressure connection to the high pressure port of the valve plate and to urge the valve plate to the block surface.

11. A power transfer unit as claimed in claim 2, wherein the interconnecting means is arranged to provide two complete reciprocations for each piston per revolution of the cylinder blocks.

12. A power transfer unit as claimed in claim 1, including for each cylinder an elastomeric seal engaging the associated piston adjacent the first-mentioned chamber.

13. A power transfer unit as claimed in claim 12, including a leakage collecting groove arranged in each cylinder on the side of the elastomeric seal away from the said first-mentioned chamber and a duct leading from the groove to the leakage collecting means for the associated cylinder block.

14. A power transfer unit as claimed in claim 13, including flow passage means for each cylinder block collecting the leakage flow from the ducts in the cylinder block and the carrying of such leakage flow over the rotary bearing for the block.

* * * * *